(12) United States Patent
Smith (10) Patent No.: US 8,894,365 B2
(45) Date of Patent: Nov. 25, 2014

(54) FLOWPATH INSERT AND ASSEMBLY

(75) Inventor: Darren M. Smith, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 758 days.

(21) Appl. No.: 13/172,128

(22) Filed: Jun. 29, 2011

(65) Prior Publication Data

US 2013/0000769 A1   Jan. 3, 2013

(51) Int. Cl.
    *F01D 9/04*        (2006.01)
    *F01D 25/26*       (2006.01)

(52) U.S. Cl.
    CPC . *F01D 9/04* (2013.01); *F01D 25/26* (2013.01)
    USPC .................. 415/209.2; 415/209.4; 415/210.1

(58) Field of Classification Search
    CPC ............ F01D 9/02; F01D 9/04; F01D 9/042;
         F01D 25/24; F01D 25/243; F01D 25/246;
         F05D 2240/122; F05D 2240/129; F05D 2240/14
    USPC ............ 415/142, 208.2, 209.1, 209.2, 209.3,
         415/209.4, 210.1, 211.2, 213.1, 214.1,
         415/219.1, 220
    See application file for complete search history.

(56) References Cited

U.S. PATENT DOCUMENTS

| | | | |
|---|---|---|---|
| 3,369,366 A | 2/1968 | Howald | |
| 4,993,918 A * | 2/1991 | Myers et al. .................. 415/191 |
| 5,080,555 A | 1/1992 | Kempinger | |
| 5,483,792 A * | 1/1996 | Czachor et al. ................. 60/796 |
| 5,609,467 A | 3/1997 | Lenhart et al. | |
| 6,123,506 A * | 9/2000 | Brand et al. ............... 415/208.3 |
| 6,543,996 B2 | 4/2003 | Koschier | |
| 7,195,456 B2 * | 3/2007 | Aggarwala et al. ........ 415/208.2 |
| 8,371,810 B2 * | 2/2013 | Roberts, III ................... 415/191 |
| 2002/0157250 A1 * | 10/2002 | Haendler et al. ............. 29/889.7 |
| 2004/0103534 A1 * | 6/2004 | Lundgren et al. .......... 29/889.22 |
| 2010/0132374 A1 | 6/2010 | Manteiga et al. | |
| 2010/0135777 A1 | 6/2010 | Manteiga et al. | |
| 2010/0135786 A1 | 6/2010 | Manteiga et al. | |
| 2010/0247303 A1 * | 9/2010 | Roberts, III ................... 415/200 |

FOREIGN PATENT DOCUMENTS

| | | |
|---|---|---|
| WO | WO2008/107401 A1 | 9/2008 |
| WO | WO2011/047693 A1 | 4/2011 |
| WO | WO2013095211 A1 * | 6/2013 |

* cited by examiner

*Primary Examiner* — Edward Look
*Assistant Examiner* — Jesse Prager
(74) *Attorney, Agent, or Firm* — Kinney & Lange, P.A.

(57) ABSTRACT

A flowpath assembly for a gas turbine engine includes a plurality of flowpath insert ducts arranged in a cascade configuration. Each flowpath duct includes a radially inward wall, a radially outward wall, a first side wall, and a second side wall. A flowpath volume is defined between the inward, outward, first side and second side walls. The first side wall of a given one of the plurality of flowpath insert ducts is positioned adjacent to the second sidewall of an adjacent one of the plurality of flowpath insert ducts in the cascade configuration.

12 Claims, 8 Drawing Sheets

FLOWPATH INSERT AND ASSEMBLY

STATEMENT OF GOVERNMENT INTEREST

This invention was made with government support under Contract No. N00019-02-C-3003 awarded by the United States Navy. The government has certain rights in the invention.

BACKGROUND

The present invention relates generally to gas turbine engines, and more particularly to flowpath structures for use in gas turbine engines.

Gas turbine engines typically include an exhaust case located at an aft (or rear) portion of the engine, through which hot fluid is exhausted from the engine. When a temperature delta results in a thermal fight, and/or a complex aero configuration is required, prior art exhaust cases could be undesirably complicated in design and heavy, and could produce too much fluid leakage.

Therefore, it is desired to provide an improved flowpath structure for a gas turbine engine suitable for use in an exhaust case assembly.

SUMMARY

A flowpath assembly for a gas turbine engine according to the present invention includes a plurality of flowpath insert ducts arranged in a cascade configuration. Each flowpath duct includes a radially inward wall, a radially outward wall, a first side wall, and a second side wall. A flowpath volume is defined between the inward, outward, first side and second side walls. The first side wall of a given one of the plurality of flowpath insert ducts is positioned adjacent to the second sidewall of an adjacent one of the plurality of flowpath insert ducts in the cascade configuration.

While the above-identified drawing figures set forth an embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

In general, the present invention provides a flowpath assembly suitable for use in a gas turbine engine, such as in a gas turbine engine exhaust case assembly. A plurality of flowpath insert ducts are provided in a cascade configuration, with side walls of adjacent insert ducts located next to one another such that vane structures can be formed where side walls of adjacent flowpath insert ducts meet. A leading edge piece and/or a trailing edge piece can be provided at each interface between adjacent insert ducts. A cold frame can be provided to provide radial support such that the flowpath insert ducts can "float" relative to the cold frame with the cold frame providing radial support to the engine. Each flowpath insert duct can be provided in multiple parts, such as in two halves that are attached together at respective flanges with suitable fasteners. In some embodiments, cartridge housings can be used to secure adjacent flowpath insert ducts together, using retention hooks and a translating retention plate. Additional features and benefits of the present invention will be appreciated in view of the description that follows and the accompanying figures.

Figure 1:
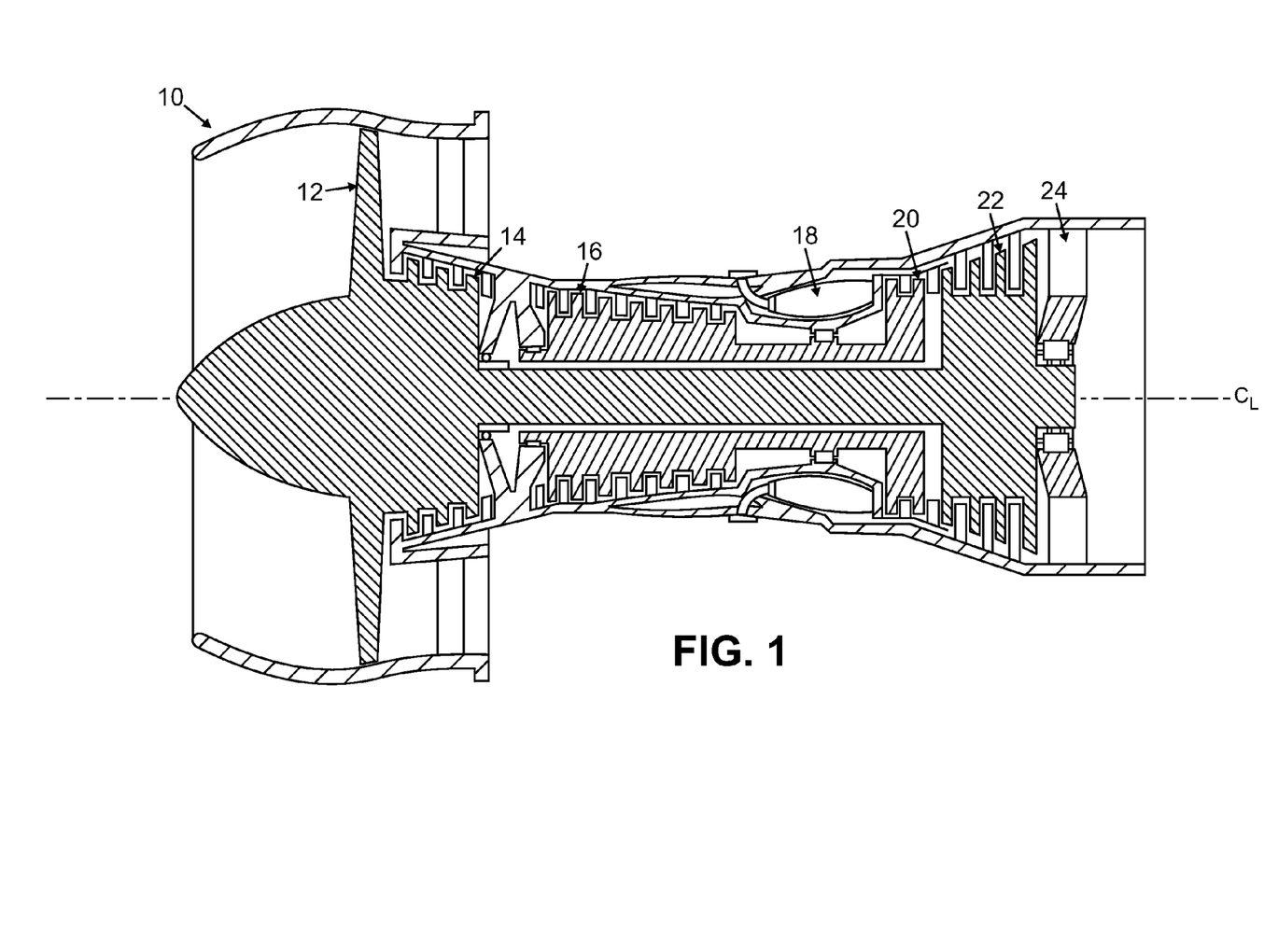
FIG. 1 is a cross-sectional view of an embodiment of a gas turbine engine.

FIG. 1 is a cross-sectional view of an embodiment of a gas turbine engine 10 that includes a fan section 12, a low pressure compressor (LPC) section 14, a high pressure compressor (HPC) section 16, a combustor section 18, a high pressure turbine (HPT) section 20, a low pressure turbine (LPT) section 22, and a turbine exhaust case (TEC) assembly 24 (sometimes simply referred to as a exhaust case assembly). In the illustrated embodiment, the engine 10 has a two-spool configuration, with spools arranged to rotate about a centerline $C_L$. Because the basic construction and operation of gas turbine engines is well-known to those of ordinary skill in the art, further explanation is unnecessary. However, it should be noted that the present invention is suitable for use with gas turbine engines of nearly any configuration, and the illustrated embodiment is shown merely by way of example and not limitation. For example, the illustrated embodiment shows a high bypass ratio engine, while the present invention is equally applicable to low bypass ratio engines as well.

Figure 2:
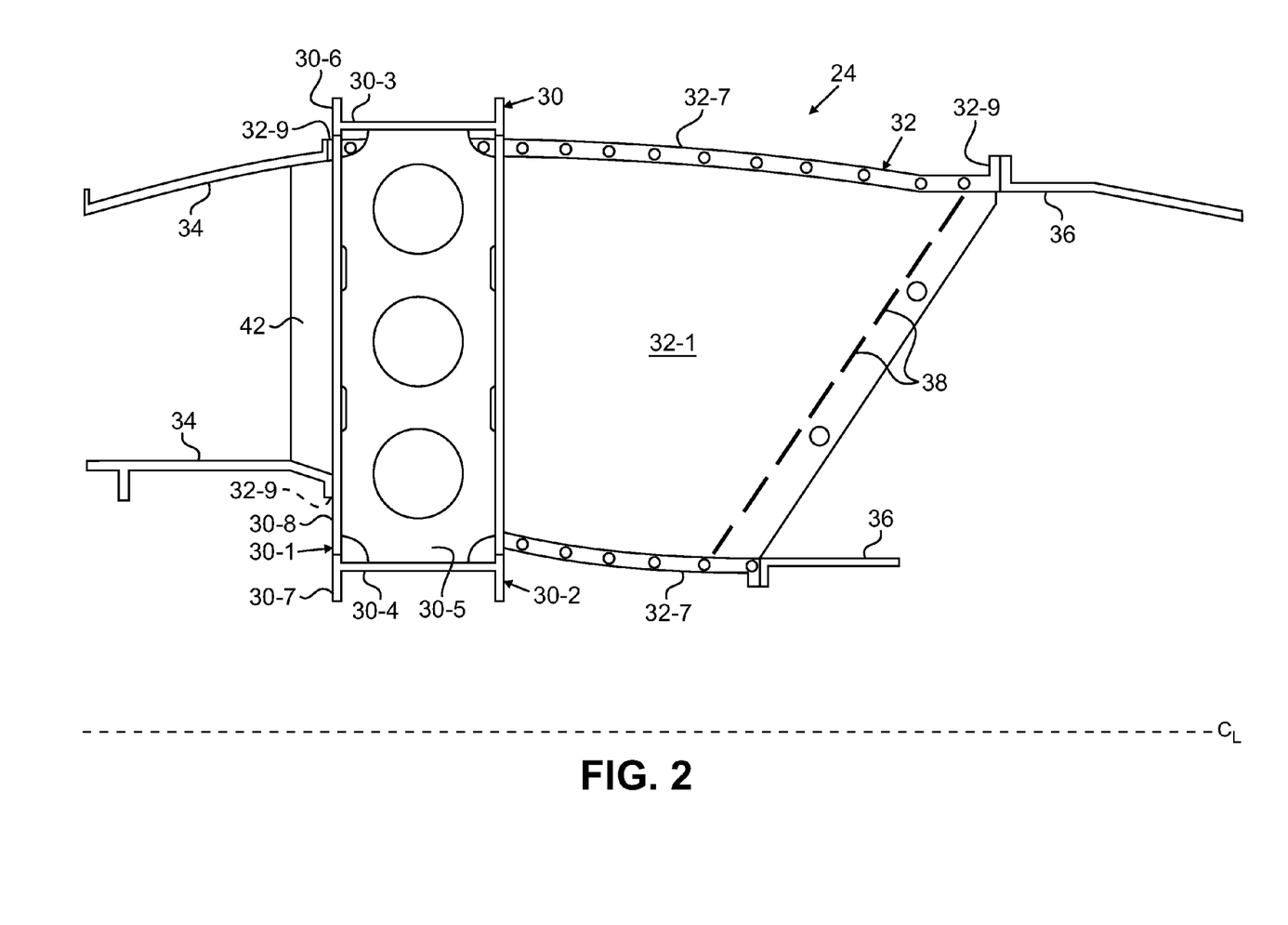
FIG. 2 is a cross-sectional view of an embodiment of an exhaust case assembly of the gas turbine engine according to the present invention.

FIG. 2 is a cross-sectional view of an embodiment of the exhaust case assembly 24, which includes a cold frame 30 and a plurality of flowpath insert ducts 32. As shown in FIG. 2, the exhaust case assembly 24 is positioned between a first duct 34 and a second duct 36. The flowpath insert ducts 32 define interior flowpath volumes for the passage of fluids, which are typically hot exhaust gases. The cold frame 30 is positioned outside of the flowpath volumes and therefore typically in a relative cold area of the engine 10.

Figure 3:
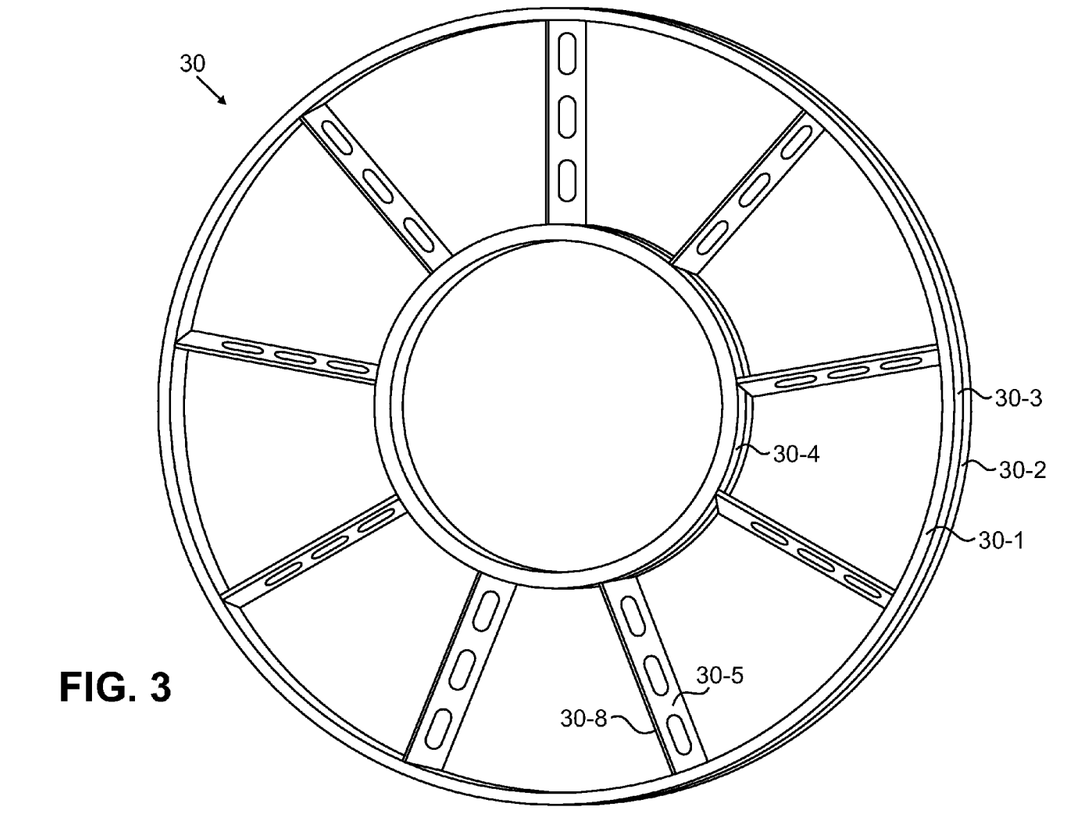
FIG. 3 is a perspective view of a cold frame of the exhaust case assembly of FIG. 2.

FIG. 3 is a perspective view of the cold frame 30, which includes a front frame member (or plate) 30-1, a rear frame member (or plate) 30-2, an outer diameter (OD) ring 30-3, an inner diameter (ID) ring 30-4, and reinforcement members (or gussets) 30-5. In the illustrated embodiment, the front and rear frame members 30-1 and 30-2 each include an OD annular portion 30-6 and an ID annular portion 30-7 with a plurality of circumferentially spaced spokes 30-8 extending radially between the OD and ID annular portions 30-6 and 30-7. The OD ring 30-3 and the ID ring 30-4 each extend generally axially between the front and rear frame members 30-1 and 30-2 at the OD annular portions 30-6 and the ID annular portions 30-7, respectively. The reinforcement members 30-5 extend between the front and rear frame members 30-1 and 30-2, and the OD and ID rings 30-6 and 30-7. The cold frame 30 can be made from suitable metallic materials, or alternatively composites or other desired materials. The front and rear frame members 30-1 and 30-2, the reinforcement members 30-5, and the OD and ID rings 30-6 and 30-7, can be cut to shape from sheet using water jet cutting, or other suitable processes. Once cut, the OD and ID rings 30-6 and 30-7 can be rolled to an annular shape and welded. The reinforcement members 30-5 can be welded to the front and rear frame members 30-1 and 30-2 and the OD and ID rings 30-6 and 30-7. Openings for weight reduction and clearance can be formed as desired in portions of the cold frame 30, such as in the reinforcement members 30-5.

Figure 4:
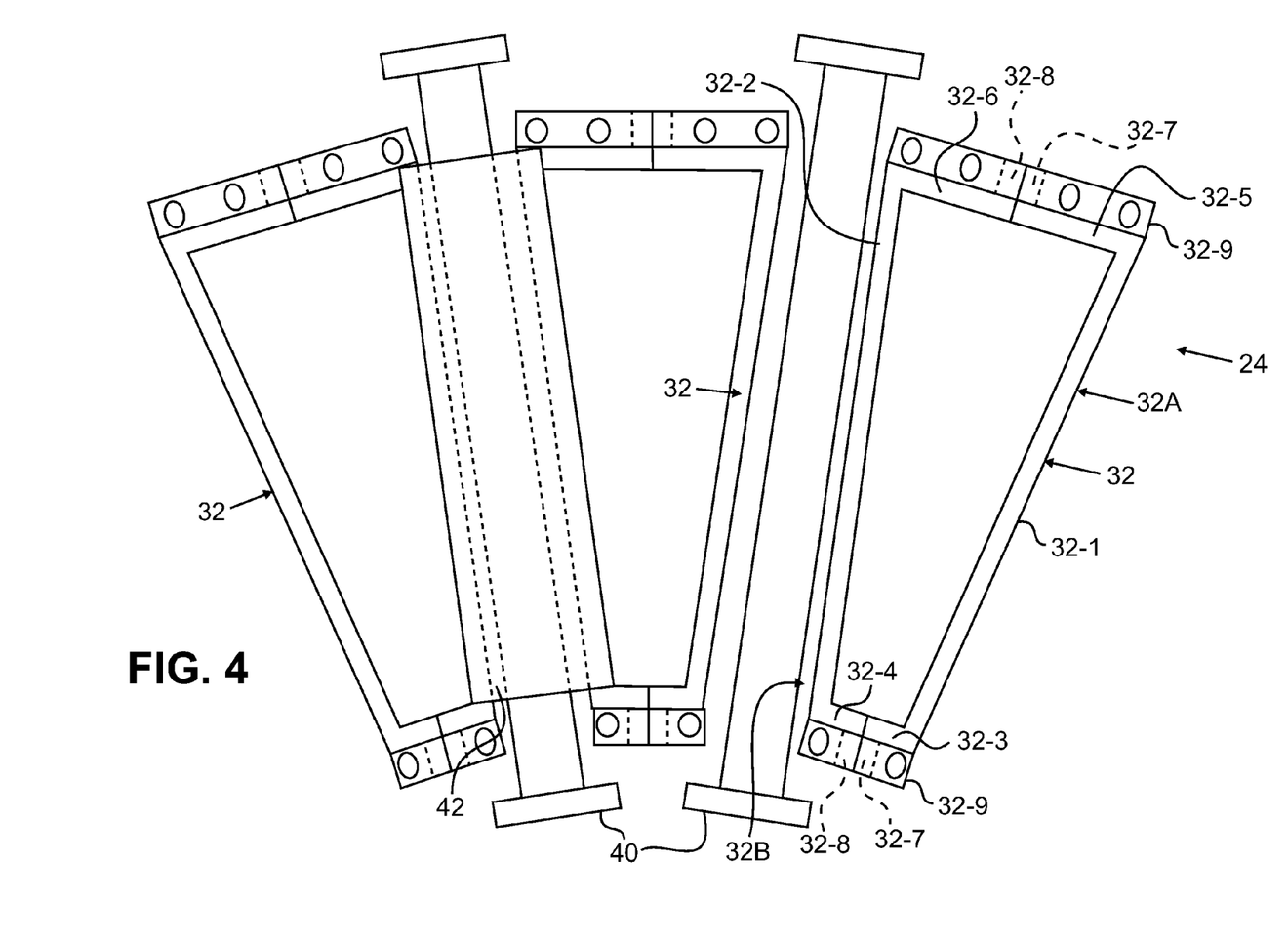
FIG. 4 is a front view of a portion of the exhaust case assembly of FIG. 2.
Figure 5:
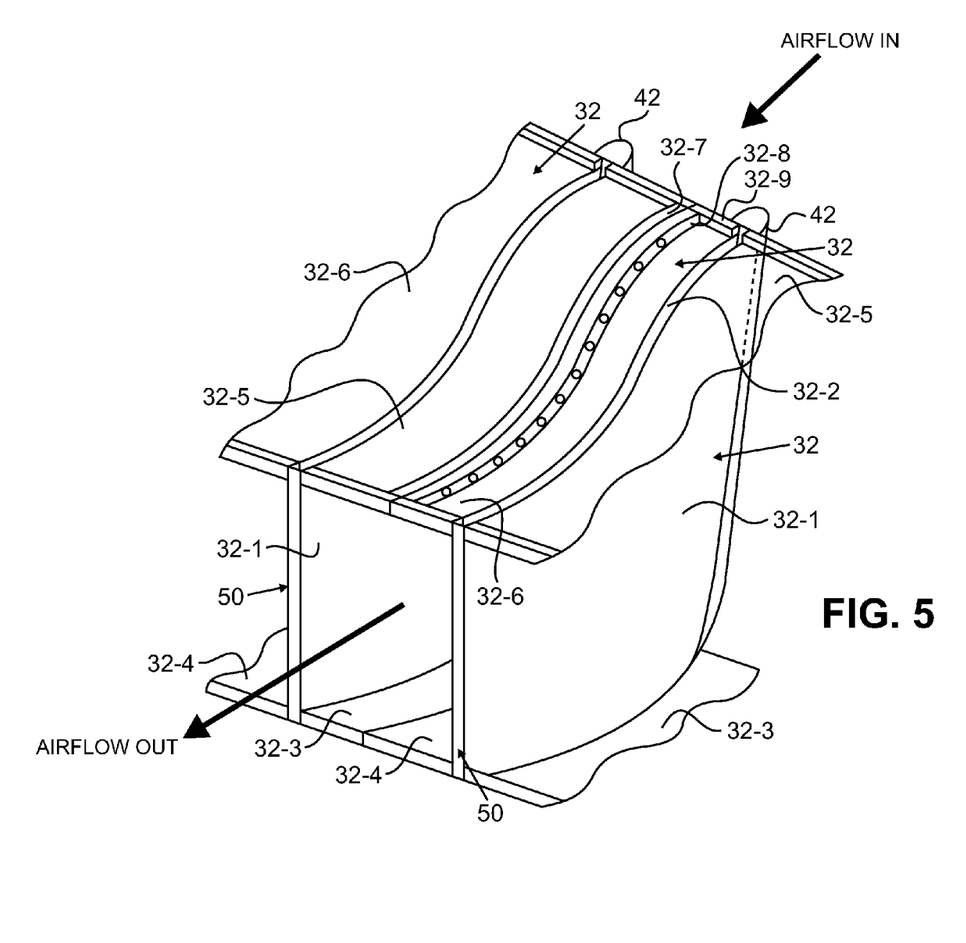
FIG. 5 is an aft perspective view of a portion of the exhaust case assembly of FIG. 2.

FIG. 4 is a front view of a portion of the exhaust case assembly 24 (shown looking aft), and FIG. 5 is an aft perspective view of a portion of the exhaust case assembly 24. The flowpath insert ducts 32 are arranged in a cascade configuration, and each insert duct 32 defines an interior flowpath volume through which fluids can pass (shown schematically by arrows in FIG. 5). Gaps between adjacent inserts 32 can allow space for the cold frame and/or radially-extending tubes 40 or other components (see FIG. 4). These gaps can be arranged outside of an exhaust flowpath of the engine 10 and outside of the interior flowpath volumes of the insert ducts 32.

Each flowpath insert duct 32 can be made of multiple sub-parts attached together, though in alternative embodiments the inserts 32 can be of a one-piece construction. In the illustrated embodiment, the flowpath insert ducts 32 are of a two-piece construction, with a first part 32A and a second part 32B that are attached together. A multi-part construction has numerous advantages, including increased ease of repair or replacement of damaged components without requiring repair or replacement of an entire insert duct 32. The flowpath insert ducts 32 can be made from suitable metallic or composite materials. For metallic materials, stamping, hydro- and bulge-forming and casting can be used to create the parts.

Each flowpath insert duct 32 includes side walls 32-1 and 32-2, first and second inward wall portions 32-3 and 32-4, first and second outer wall portions 32-5 and 32-6. The inner and outer wall portions could be integrally formed along with one or both side walls 32-1 and 32-2 and a single piece, depending on the geometry desired. The side wall 32-1, the first inward wall portion 32-3 and the first outward wall portion 32-5 are part of the first part 32A, and generally have a U-shaped configuration. Likewise, the side wall 32-2, the second inward wall portion 32-4 and the second outward wall portion 32-6 are part of the second part 32B, and generally have a U-shaped configuration. The first and second parts 32A and 32B can further include substantially axially-extending flanges 32-7 and 32-8, respectively, located at the inward and outward wall portions 32-3, 32-4, 32-5 and 32-6. The flanges 32-7 and 32-8 can adjoin each other in a close-fitting relationship and accept suitable fasteners (e.g., rivets, bolts, etc.) to secure the parts 32A and 32B together with the first and second inward wall portions 32-3 and 32-4 adjoining each other to collectively define an inward wall and the first and second outward wall portions 32-5 and 32-6 adjoining each other to collectively define an outward wall. Suitable fluidic seals can be formed by abutment of the wall portions 32-3, 32-4, 32-5 and 32-6 at the resultant joints. A flowpath volume is defined by each insert duct 32, bounded by the side walls 32-1 and 32-2 and the inward and outward walls (including portions 32-3, 32-4, 32-5 and 32-6). It should be noted that the shapes of portions of the insert ducts 32 are illustrated merely by way of example and not limitation. A variety of shapes are possible in further embodiments, as desired for particular applications, such as to provide desired fluidic flow through the flowpath volumes of the insert ducts 32. The parts 32A and 32B of each insert duct 32 can further include flanges 32-9 at the inward and outward walls at both forward and aft ends, to facilitate attachment of the flowpath insert duct 32 to the ducts 34 and 36 with suitable fasteners (see FIG. 2).

Retention hooks 38 can be positioned to extend outward (i.e., circumferentially or tangentially relative to the centerline $C_L$) along exterior portions of each of the side walls 32-1 and 32-2. As shown in FIG. 2, the retention hooks 38 on the side wall 32-1 are positioned in a row proximate an aft edge. The retention hooks 38 allow for engagement with corresponding structures to help secure the insert ducts 32, as explained further below.

A leading edge piece 42 can be positioned at a leading edge of an interface between adjacent flowpath insert ducts 32. The leading edge piece 42 can have an aerodynamic contour, such that adjacent side walls of adjacent flowpath insert ducts 32 can act as vanes to straighten or otherwise influence fluid flow through the exhaust case assembly 24.

Figure 6A:
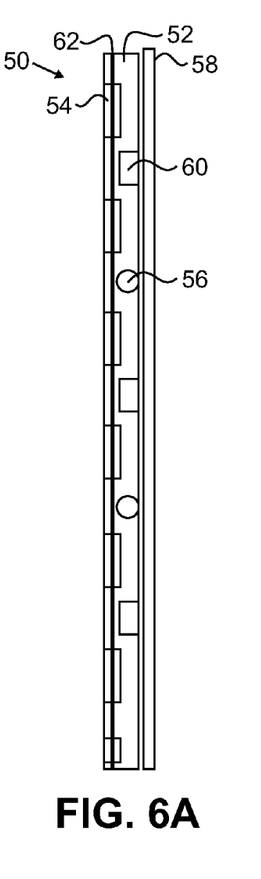
FIG. 6A is a side view of a cartridge housing assembly of the exhaust case assembly of FIG. 2.
Figure 6B:
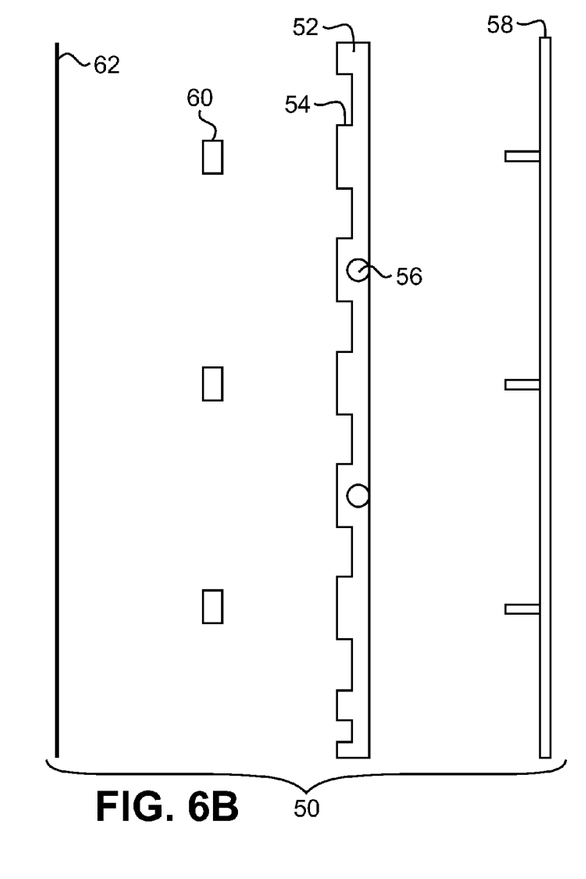
FIG. 6B is an exploded side view of the cartridge housing assembly of FIG. 6A.

FIG. 6A is a side view of a cartridge housing assembly 50 of the exhaust case assembly 24, and FIG. 6B is an exploded side view of the cartridge housing assembly 50. The cartridge housing assembly 50 of the illustrated embodiment includes a housing body 52 having a plurality of cutout notches 54 (a total of seven in the illustrated embodiment), threaded members 56, a trailing edge piece 58, retention members 60 (e.g., nuts), and a pair of retention plates 62 (only one visible in FIGS. 6A and 6B, but see FIGS. 7A and 7B). The cartridge housing assembly 50 can further include pin nuts (not shown in FIGS. 6A and 6B), which are explained further with respect to FIGS. 7A and 7B. The cartridge housing assembly 50 helps secure adjacent flowpath insert ducts 32 together. In the illustrated embodiment, the cartridge housing assembly 50 is configured to be positioned at an aft end of the flowpath insert ducts 32, and thus includes the trailing edge piece 58. The trailing edge piece 58 can be configured in an aerodynamic configuration, as desired for particular applications. However, the cartridge housing assembly 50 can also be utilized at a leading edge location, with the trailing edge piece 58 replaced by the leading edge piece 42. In alternative embodiments, either or both of the leading edge piece 42 and the trailing edge piece 58 can be secured to adjacent flowpath insert ducts 32 in any other suitable manner (e.g., using rivets, bolts, etc.) without the use of the cartridge housing assembly 50.

Figure 7A:
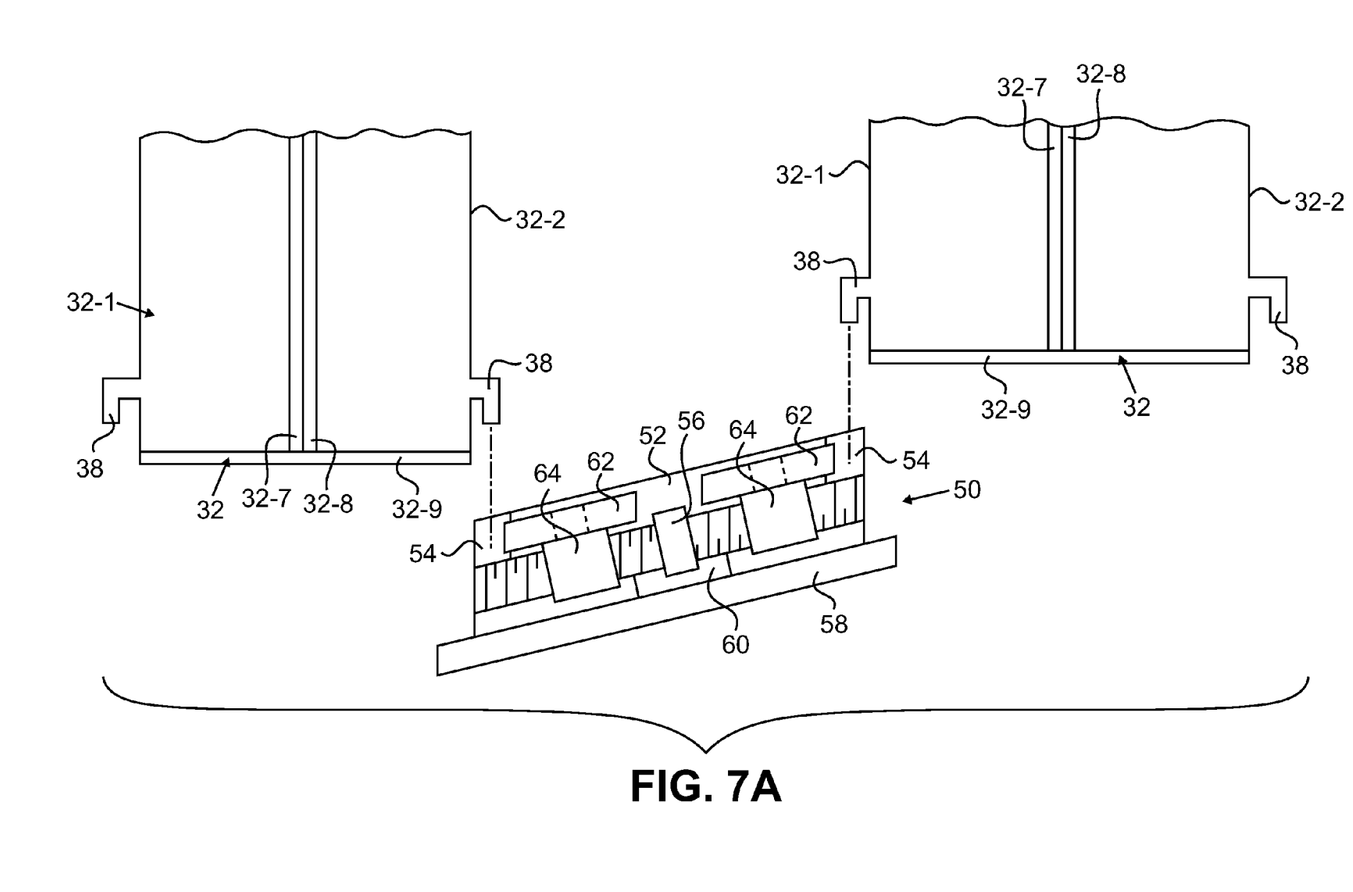
FIG. 7A is an exploded top view of a portion of the exhaust case assembly of FIG. 2, shown prior to assembly.
Figure 7B:
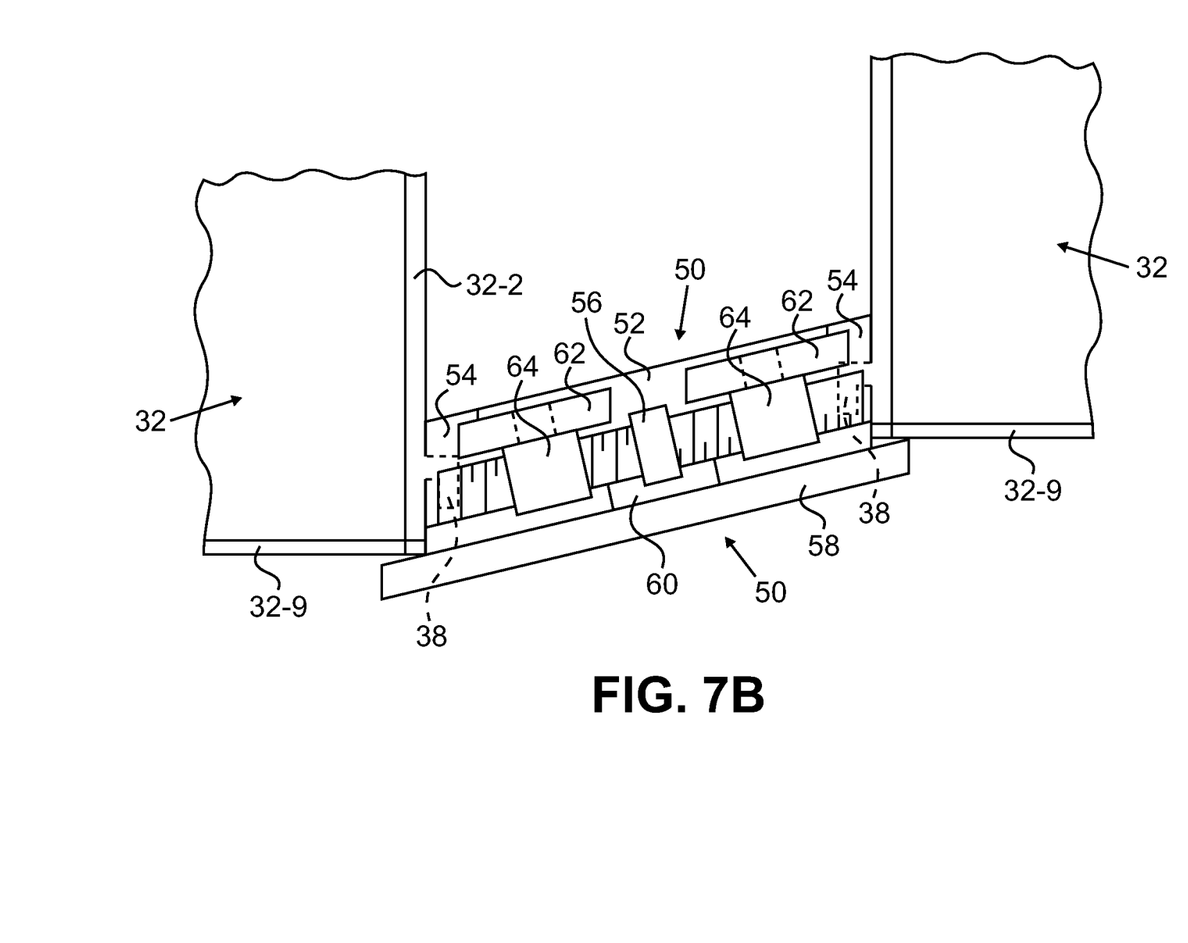
FIG. 7B is a top view of the portion of the exhaust case assembly of FIG. 7A, shown after completed assembly.

FIG. 7A is an exploded top view of a portion of the exhaust case assembly 24, shown prior to assembly, and FIG. 7B is a top view of the portion of the exhaust case assembly 24, shown after completed assembly. As shown in FIGS. 6A-7B, the cartridge housing assembly 50 is configured such that the trailing edge piece 58 can be fixedly attached to the housing body 52 with the retention members 60, such as with threaded extensions from the trailing edge piece 58. The housing body 52 has a plurality of cutout notches 54 defined along both sides of a leading edge. The cutout notches 54 provide openings into which at least a portion of a corresponding retention hook 38 of a given flowpath insert duct 32 can be inserted and engaged. The threaded members 56 (two a provided in the illustrated embodiment, though greater or fewer can be provided in alternative embodiments) are rotatably secured to the housing body 52, and can include reverse-threaded portions at either end and an engagement portion for engagement with a rotation tool in a center portion. A pair of pin nuts 64 can be threadably engaged with the end portions of each threaded member 56, such that rotation of the threaded member 56 in a first direction can cause the pin nuts 64 to move (i.e., translate) apart and rotation in an opposite, second direction can cause the pin nuts 64 to move (i.e., translate) together. One of the retention plates 62 is engaged with each pin nut 64, such that the retention plates 62 each move (i.e., translate) together with the associated pin nuts 64. The retention plates are arranged proximate to the cutout notches 54 in the housing body 52. As shown in FIG. 7A, the retention plates 62 can be positioned to allow access to the cutout notches 54 to facilitate insertion of corresponding retention hooks 38 of the flowpath insert ducts 32. After the retention hooks 38 are engaged with the cutout notches 54, the retention plates can be translated by way of rotational adjustment of the threaded members 56 to extend over or into the cutout notches 54 and thereby block an exit path of the retention hooks 38 from the cutout notches 54 and lock the retention hooks 38 relative to the housing body 52. Disengagement of the flowpath insert duct 32 can be achieved simply by reversing the process, by rotating the threaded members 56 and then removing the retention hooks 38 from the cutout notches 54.

Any relative terms or terms of degree used herein, such as "substantially", "approximately", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, although the present invention has been described with respect to an embodiment as an exhaust case assembly, the flowpath structures of the present invention could be readily used for other applications in other portions of a gas turbine engine, such as in a mid-turbine assembly. Therefore, it is intended that the invention not be limited to the particular embodiment(s) disclosed, but that the invention will include all embodiments falling within the scope of the appended claims.

The invention claimed is:

1. A flowpath assembly for a gas turbine engine, the assembly comprising:
    a plurality of flowpath insert ducts arranged in a cascade configuration, each flowpath duct including:
        a radially inward wall;
        a radially outward wall;
        a first side wall;
        a second side wall, wherein a flowpath volume is defined between the inward, outward, first side and second side walls; and
        a plurality of outward-facing retention hooks located on each of the first and second side walls of each of the flowpath ducts,
        wherein the first side wall of a given one of the plurality of flowpath insert ducts is positioned adjacent to the second sidewall of an adjacent one of the plurality of flowpath insert ducts in the cascade configuration; and
    a plurality of housing cartridges configured to engage the opposed retention hooks of adjacent flowpath ducts to provide engagement therebetween, wherein each housing cartridge comprises:
        a body;
        a plurality of cutout notches defined in the body configured to accept the retention hooks of flowpath ducts;
        a threaded member;
        a movable member threadably engaged with the threaded member;
        a retention plate engaged with the movable member and positioned proximate a row of the plurality of cutout notches, wherein rotation of the threaded member produces translational movement of the movable member and the retention plate such that retention hooks of at least one of the flowpath ducts can be removably retained in the cutout notches by the retention plate.

2. The assembly of claim 1 and further comprising:
    a plurality of leading edge pieces positioned at leading edge locations of interfaces between adjacent flowpath ducts.

3. The assembly of claim 1 and further comprising:
    a cold frame, wherein the plurality of flowpath ducts extend through the cold frame, and therein the cold frame extends through at least one gap between a pair of the plurality of flowpath insert ducts, the gap defined outside of the flowpath volumes.

4. The assembly of claim 1, wherein each flowpath duct comprises a first part and a second part attached together, the first part including the first side wall, a first portion of the inward wall and a first portion of the outward wall, the second part including the second side wall, a second portion of the inward wall and a second portion of the outward wall.

5. The assembly of claim 4 and further comprising:
    flanges on opposed portions of the first and second parts of each flowpath duct for securing the first part and the second part together with fasteners.

6. The assembly of claim 1 and further comprising:
    a trailing edge piece attached to each housing cartridge and configured to extend between adjacent flowpath ducts.

7. The assembly of claim 1 and further comprising:
    forward and aft flanges on each of the flowpath ducts for attachment to adjacent gas turbine engine components.

8. A flowpath insert assembly for a gas turbine engine, the assembly comprising:
    a first part that includes a first side wall, a first portion of an inward wall, a first portion of an outward wall, and at least one substantially axially-extending first connection flange;
    a second part including a second side wall, a second portion of the inward wall, a second portion of the outward wall, and at least one substantially axially-extending second connection flange;
    a plurality of outward-facing retention hooks located on each of the first and second side walls; and
    a housing cartridge configured to engage the retention hooks of the first and second side walls, wherein the housing cartridge includes a threaded member and a retention plate, wherein rotation of the threaded member produces translational movement of the retention plate such that retention hooks of at least one of the first and second side walls can be removably retained relative to the housing cartridge by the retention plate,
    wherein the first part and the second part at attached together with fasteners secured to the first and second connection flanges such that the first and second portions of the inward wall adjoin each other and the first and second portions of the outward wall adjoin each other, and wherein a flowpath volume is defined between the inward, outward, first side and second side walls.

9. A flowpath insert assembly for a gas turbine engine, the assembly comprising:
a side wall;
an inward wall segment extending from the side wall;
an outward wall segment extending from the side wall, wherein the side wall, the inward wall segment and the outward wall segment define a substantially U-shaped configuration;
a substantially axially-extending connection flange having openings for fastener attachment, the connection flange located on one of the inward wall segment and the outward wall segment;
a plurality of outward-facing retention hooks located on the side wall; and
a housing cartridge configured to engage the retention hooks of the side wall, wherein the housing cartridge includes a threaded member and a retention plate, wherein rotation of the threaded member produces translational movement of the retention plate such that the retention hooks can be removably retained by the retention plate.

10. A flowpath assembly for a gas turbine engine, the assembly comprising:
a plurality of flowpath insert ducts arranged in a cascade configuration, each flowpath duct including:
a radially inward wall;
a radially outward wall;
a first side wall;
a second side wall, wherein a flowpath volume is defined between the inward, outward, first side and second side walls; and
a retention hook located on each of the flowpath ducts, wherein the first side wall of a given one of the plurality of flowpath insert ducts is positioned adjacent to the second sidewall of an adjacent one of the plurality of flowpath insert ducts in the cascade configuration; and
a plurality of housing cartridges configured to engage the retention hooks of adjacent flowpath ducts to provide engagement therebetween, wherein each housing cartridge comprises:
a body;
a plurality of cutout notches defined in the body configured to accept the retention hooks of flowpath ducts;
a threaded member;
a retention plate positioned proximate at least one of the plurality of cutout notches, wherein rotation of the threaded member produces translational movement of the retention plate such that the retention hook of one of the flowpath ducts can be removably retained in a corresponding one of the cutout notches by the retention plate.

11. The assembly of claim 10, wherein each flowpath duct comprises a first part and a second part attached together, the first part including the first side wall, a first portion of the inward wall and a first portion of the outward wall, the second part including the second side wall, a second portion of the inward wall and a second portion of the outward wall.

12. The assembly of claim 10 and further comprising:
a cold frame, wherein the plurality of flowpath ducts extend through the cold frame, and therein the cold frame extends through at least one gap between a pair of the plurality of flowpath insert ducts, the gap defined outside of the flowpath volumes.

\* \* \* \* \*